June 2, 1942.  G. E. BULLOCK  2,285,010
VALVE OPERATING MEANS
Filed Aug. 2, 1940

INVENTOR
GILES E. BULLOCK
BY
ATTORNEY

Patented June 2, 1942

2,285,010

UNITED STATES PATENT OFFICE 2,285,010

VALVE OPERATING MEANS

Giles E. Bullock, Rochester, N. Y.

Application August 2, 1940, Serial No. 349,628

2 Claims. (Cl. 251—134)

This invention relates to manually operated valves used for regulating the flow of liquid for sprinkling and spraying purposes and the principal object of this invention is to provide such a valve with novel means for quickly and easily holding the valve in a predetermined open position for uniform sprinkling or spraying purposes, and for quickly and easily releasing the valve from this opened position to instantaneously shut off the liquid passing therethru.

Another object of this invention is to so construct the valve locking and releasing mechanism that it may be readily operated with the thumb or a finger of the same hand with which the sprinkling or spraying nozzle is manipulated.

These and other objects of this invention will become more readily apparent from the detailed description thereof which follows, reference being had to the accompanying drawing in which Figure 1 is a side elevation of a spray valve provided with my novel valve locking device.

Figure 1:
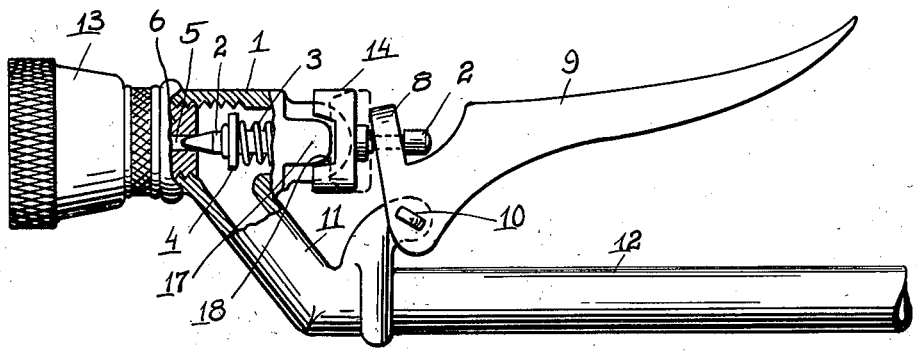

The spray valve which embodies my novel locking device for locking the valve open to effect a predetermined and constant sprinkling or spraying action comprises the hollow valve body 1 in which the valve stem 2 is mounted to move back and forth therein. An expansion spring 3 surrounds the valve stem within the valve body and is interposed between the washer 4 carried thereby and the closed end of the valve body to normally urge the valve stem into the valve opening 5. The latter is provided in the plug 6 which is threaded into and closes the forward end of the valve body except for the valve opening which extends therethru.

The valve stem is provided on the outside of the valve body, near the rear end thereof, with the annular recess 7 to have the yoke 8 of the handle 9 engage thereinto for movement thereby. The handle is pivoted at 10 on a lug provided near the intake 11 of the valve body and is so arranged that by gripping the handle and the hose 12 which surrounds the intake 11, a closing of the hand will rock and force the handle 9 toward the hose to cause the valve stem to be drawn to the right out of the valve opening 5. The valve opening is thus opened to have liquid from the valve body pass therethru into the nozzle 13. The valve stem is tapered so as to gradually open and close the valve opening in its movement by the handle to regulate the flow of the liquid thru the valve.

The spring 3 operates to immediately move the valve stem into its closed position in the valve opening 5 whenever pressure on the handle is released so that if it is desired to keep the valve open for a constant stream or spray, a constant pressure of the hand on the handle is necessary. This is inconvenient when a large amount of uniform spraying or sprinkling is to be done and to make uniform and continuous spraying or sprinkling possible without having to manually hold the valve in an operated position, I provide the valve with a rotary locking member in the form of a cylindrical collar 14 which is concentrically supported and mounted to rotate on the valve stem 2 at the rear of the valve body 1. This cylindrical collar is provided with a web 15 and hub 16 with which the collar is revolvably supported on the valve stem between the rear of the valve body and the annular recess 7 in the valve stem. The collar thus forms a rotatable spacing member which is adapted to have its outer free edge engage the ends of the lugs 17 which are provided on the valve body diametrically spaced from each other. In the spacing collar are provided two recesses 18, 18 which are so arranged that the ends of the lugs 17, 17 may engage thereinto and permit the spacing collar to move endwise by telescoping over the rear end of the valve body.

As illustrated in solid and dotted lines in Figure 1, the yoke 8 is thus adapted to be variably spaced by the spacing collar from the rear of the valve body so as to allow the spring 3 to force the valve stem into the valve opening and close the valve in one position or keep the valve stem fully opened in the other position.

The spacing collar, as above pointed out, is rotatable on the valve stem and by depressing the valve handle the spacing collar is drawn rearwardly with the movement of the valve pin out of contact with the lugs 17 so that it may be freely rotated and positioned to have the lugs 17 engage into the recesses 18 or have them rest against the outer edge of the collar to either allow the valve pin to close the valve opening or to keep it open on the release of the handle.

The end of the hub 16 serves as the stop against which the yoke 8 rests at the rear of the locking member while the outer edge of the spacing collar 14 rests against the ends of the lugs 17 in holding the valve stem open.

Figure 3:
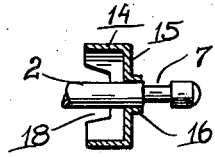
Figure 3 is a detail sectional view of the locking device as it appears mounted on the valve stem.
Figure 2:
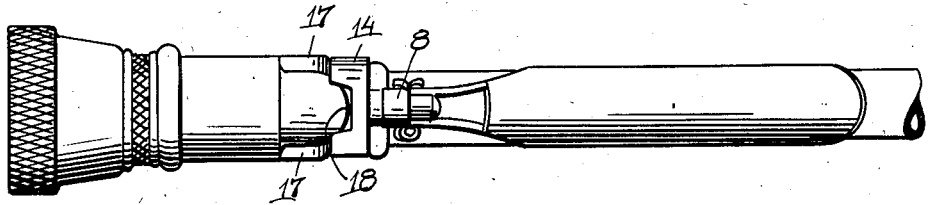
Figure 2 is a top plan view of the spray valve illustrated in Figure 1.
Figure 4:
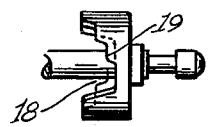
Figure 4 is a detail side elevation of a modified form of the locking device.

For the purpose of holding the valve stem partially open, that is in positions intermediate the open and closed positions provided by the recess 18 in the spacing collar 14 illustrated in Figures 1 to 3 inclusive, the recess may be enlarged and provided with a series of shoulders 19 on one side of each of the openings 18 as illustrated in Figure 4. In this way the lugs 17 of the valve body can engage the shoulders 19 and provide but a partial closing movement of the valve stem on the release of the handle 9.

I claim:

1. In a valve for spraying and sprinkling purposes having a valve body and a spring pressed valve stem movable in and out of said valve body, handle means mounted to swing on said valve body in engagement with said valve stem for movement of said valve stem in one direction, a cylindrical spacing collar coaxially held and rotatably mounted on said valve stem between its handle connection and the valve body, a notch with a plurality of shoulders in one side thereof extending into one side of said spacing collar and stop means carried on said valve body for engagement with said shoulders for variable endwise movement of said spacing collar with said valve stem relative to said valve body.

2. In a valve for spraying and sprinkling purposes having a valve body, a spring pressed valve stem movable in and out of said valve body and handle means mounted on said valve body in engagement with said valve stem for movement of the valve stem to open the valve, a cylindrical spacing collar held coaxially supported on said valve stem between said valve body and said handle means, a notch extending into said cylindrical collar from one end thereof so as to straddle a portion of said valve body and permit telescopic engagement of said spacing collar over the end of said valve body and permit unobstructed and separate movement of said valve stem in and out of said valve body and said spacing collar, said collar being freely movable endwise on said valve stem out of telescopic engagement with said valve body on the withdrawal of said valve stem from said valve body by said handle means to provide for disengagement of said notch from said valve body and thereafter being freely rotatable on said valve stem to provide for rotation of said collar and engagement of its edge with said valve body to limit the return movement of said handle with said valve stem.

GILES E. BULLOCK.